A. M. KARR.
Mole-Plow.
No. 29,285  
Patented July 24, 1860.
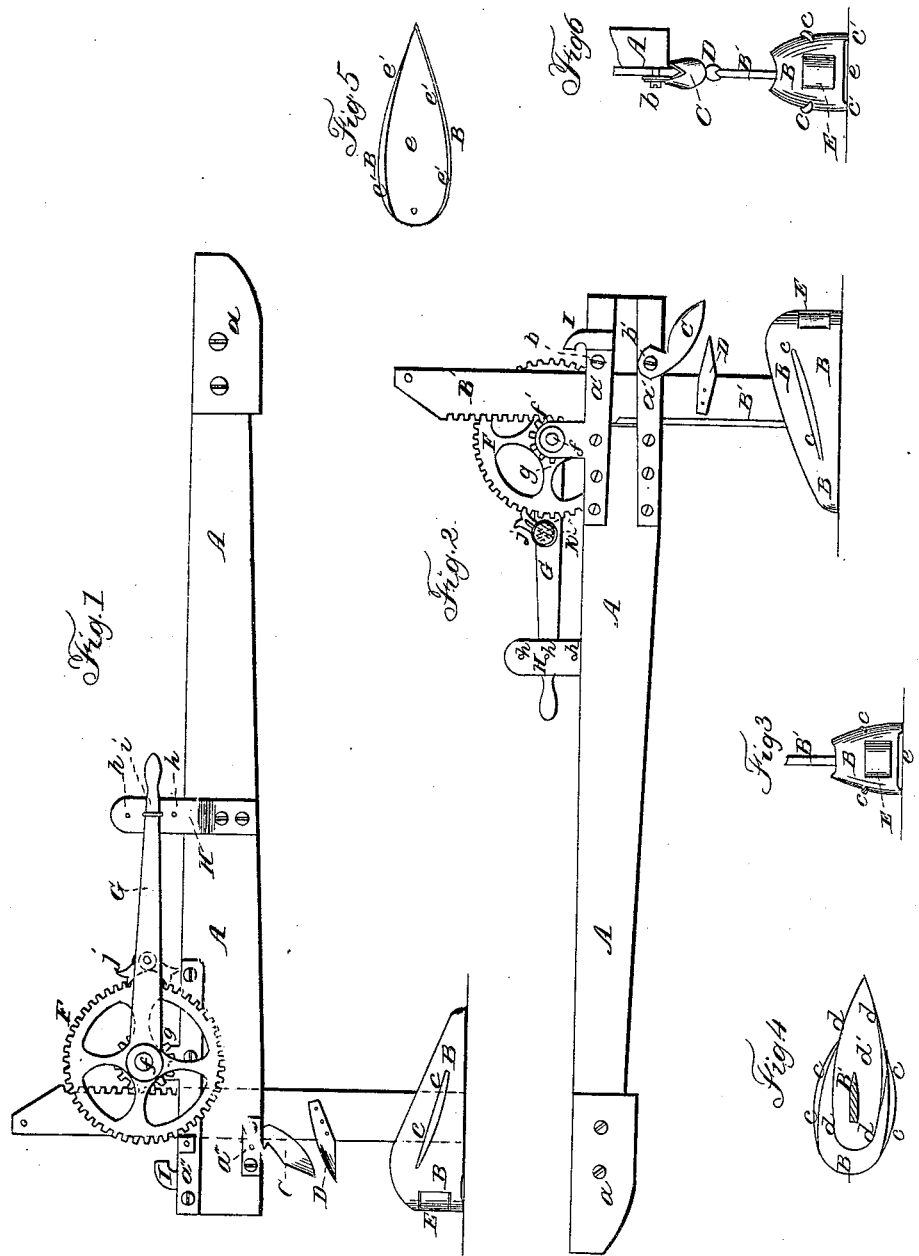

UNITED STATES PATENT OFFICE.

A. M. KARR, OF MOUNT PLEASANT, IOWA.

IMPROVEMENT IN MOLE-PLOWS.

Specification forming part of Letters Patent No. 29,285, dated July 24, 1860.

*To all whom it may concern:*

Be it known that I, A. M. KARR, of Mount Pleasant, in the county of Henry, in the State of Iowa, have invented certain new and useful Improvements in Mole-Plows; and I do hereby declare that the following is a full, clear, and exact description thereof, reference being had to the accompanying drawings, which form a part of this specification, and in which—

Figure 1 represents a side view of the machine. Fig. 2 represents a view of the opposite side of the machine when turned in a reverse direction. Fig. 3 represents a rear view of the mole and part of the colter in section. Fig. 4 represents a top view of the mole detached. Fig. 5 represents a bottom view of the mole; and Fig. 6 represents a rear view of the same, a part of the colter, together with the devices for closing the cut made by the colter, and also for guarding the drain from being filled up by water running in from above.

In the drawings, A represents the draft-beam, which is provided at its front end with runners $a\ a$. Another set might be placed just in front of the colter; but the beam A is made of such runner form that only one set at the front end is generally necessary. One side of the rear end of beam A is cut out, so as to make room for the colter B′, which slides up between guide-pieces $a'\ a'$ and the beam A.

To the lower end of the colter B′ is rigidly secured the mole B, which is made sharp or pointed in front, with a gradual increase in height and width as it extends back and up until it reaches a point on a line with the rear of the colter, when the mole begins to slightly taper inward again. The entire top of the mole is recessed or cut out, so as to leave a wide groove or space, $d'$, within the thin margin $d$, while a similar recess, $e$, is made on the bottom, within the margin $e'$.

On the opposite side of the beam A from the colter B is a gear, F, which is rigidly secured to one end of shaft $f$, which is supported in the upper pieces, $a'$, and pieces $a''$, and which carries on its other end a small gear, $g$, which gears into teeth $f'$ on the colter B′.

On the end of shaft $f$, and outside of gear F, is placed loosely one end of lever G, while the other end extends forward by a standard, H, which is rigidly attached to the side of beam A, and is also provided with a series of holes, $h\ h$, whereby lever G can be held in different positions by means of pin $i$, which can be passed through a hole in the end of lever G and into one of the holes $h$. Lever G is also provided with a double pawl, $j$, which in turn is provided with a spring, whereby it can be made to hold the gear F whichever side of the pawl is in action.

The operation is as follows: As the beam A is drawn forward the colter B cuts through the earth and also carries forward the mole B, which in turn opens and raises the earth and compresses it, so as to leave a drain for the passage of water. The incline groove $d'$ on top of the mole is for the purpose of raising and guiding the earth to the rear upper part of the mole, so as to close up the cut made by the colter, while the margins $e'$ on the bottom are for the purpose of forcing the earth outward to make the sides of the drain firm and compact without compressing the bottom of the same. The side fins, $c\ c$, are inclined upward, as fully shown in Fig. 2, and are for the purpose of raising and forcing up the earth from near the bottom of the sides to the upper part of the arch, where there is most danger of the drain giving way.

By the above arrangement of the parts it will be seen that the bottom of the drain, together with the sides, are left in a comparatively uncompressed state, while the upper part of the drain is well compressed. The advantage resulting from this is that the water enters the drain more readily from the bottom and sides than it would if the bottom and sides were equally compressed with the upper part of the drain, while the upper part of the drain is more compactly compressed than it could be without the use of the incline fins $c\ c$. The top of the cut made by the colter is closed up by means of a closing-scoop, C, which is attached to the rear of the colter, as shown in Figs. 2 and 6. Scoop C is concave on the under side, so that as it is drawn along in rear of the colter it gathers up the earth and forces it down into the cut made by the colter. The scoop is made with an opening on top, so that when the earth cannot all be compressed down into the cut it can rise up and press out at the top or front of the scoop, which is so hinged or fastened to the beam A that its rear end can be adjusted to any desired angle.

At a short distance below the surface of the ground is rigidly secured to the rear of the colter a closing scoop-mole, D. The office of scoop-mole D is threefold, viz: first, it tends to hold up the earth in the cut while it is being compressed by the closing-scoop C; second, it closes up the cut in a compact manner a second time by gathering earth from the sides and forcing it down into the cut; and, third, it forms a secondary drain of peculiar form above the main drain, whereby all tendency of water to wash in dirt from above before the earth becomes well settled together is avoided. As the scoop-mole C is drawn along it compresses the earth into the cut and also leaves the earth just where the cut is filled up higher than at the sides, whereby, in case water happens to run down from the surface, it is guided from the cut by the ridge in the secondary and guard drain to the side channels made on each side of the cut, where it gradually finds its way down through the solid earth into the main drain, instead of descending down through the earth in the cut made by the colter.

By the use of the double pawl $j$ the mole can be held in any desired position, for if the mole has a tendency to rise up the pawl is placed in the position shown in black lines, Figs. 1 and 2, while if it has a tendency to descend the pawl is to be placed in the position shown in red lines, same figures.

The mole and colter can also be raised or lowered by means of lever G and pawl $j$ by simply taking out pin $i$ and working lever G back and forth, when the mole and colter can be raised or lowered just as may be desired, the pawl $j$ being set properly, to work the gear F in the right direction to cause gear $g$ to work into teeth $f'$ in the front edge of the colter.

In turning corners there is much difficulty experienced, and to avoid friction, and also to make the bends in the drain more smooth and even, I provide the rear part of the mole with a roll, E, which forms nearly the whole heel of the mole. By the use of a rolling heel in the mole short curves can be made with ease, while the drain is left in a smooth and compact manner.

To remove the mole and colter from the ground, bolts $b\ b$ are withdrawn and one of them passed through the hole in the upper end of B', when, as the beam A is drawn forward, the bolt in the end of colter B' will be caught in ears I I, and the mole will then swing back and be easily drawn to the surface of the ground.

What I claim, and desire to secure by Letters Patent, is—

1. The combination, with the mole B, of the inclined side fins, $c\ c$, bottom groove, $e$, and margins $e'$, top groove, $d'$, and margins $d$, and rolling heel E, arranged in relation to each other as shown and described.

2. The combination of the closing-scoop C with the colter B' and scoop-mole D, constructed and arranged in relation to each other as and for the purposes set forth.

In witness whereof I have hereunto signed my name.

A. M. KARR.

Witnesses:
W. P. McCLURE,
W. D. LEEDHAM.